(12) United States Patent
Kim et al.

(10) Patent No.: US 8,326,304 B2
(45) Date of Patent: Dec. 4, 2012

(54) FEMTOCELL SEARCH METHOD FOR MACRO TO FEMTO HANDOVER

(75) Inventors: Won-Ik Kim, Seoul (KR); Kwang Jae Lim, Daejeon (KR); Sung Cheol Chang, Daejeon (KR); Sung-Geun Jin, Daejeon (KR); Hyun Lee, Daejeon (KR); Chul Sik Yoon, Seoul (KR)

(73) Assignees: Samsung Electronics Co., Ltd., Suwon-si (KR); Electronics & Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/001,533

(22) PCT Filed: Mar. 26, 2009

(86) PCT No.: PCT/KR2009/001553
§ 371 (c)(1),
(2), (4) Date: Dec. 27, 2010

(87) PCT Pub. No.: WO2009/157643
PCT Pub. Date: Dec. 30, 2009

(65) Prior Publication Data
US 2011/0105129 A1    May 5, 2011

(30) Foreign Application Priority Data
Jun. 27, 2008 (KR) .......... 10-2008-0061430
Oct. 13, 2008 (KR) .......... 10-2008-0100230

(51) Int. Cl.
*H04W 36/00* (2009.01)
(52) U.S. Cl. ......... 455/436; 455/443; 370/331; 370/332
(58) Field of Classification Search ......... 455/436–444, 455/422.1, 432.1; 370/31–334
See application file for complete search history.

(56) References Cited

U.S. PATENT DOCUMENTS

| 2005/0175071 A1* | 8/2005 | Hoffmann et al. ............ 375/145 |
| 2008/0132239 A1 | 6/2008 | Khetawat et al. |
| 2008/0153497 A1 | 6/2008 | Kalhan |
| 2009/0252073 A1 | 10/2009 | Kim et al. |
| 2010/0260068 A1* | 10/2010 | Bhatt et al. ..................... 370/254 |

FOREIGN PATENT DOCUMENTS

| KR | 10-2007-0055713 A | 5/2007 |
| KR | 10-2008-0014204 A | 2/2008 |
| KR | 10-2008-0045096 A | 5/2008 |
| KR | 10-2008-0100230 A | 11/2008 |
| KR | 10-2009-0105877 A | 10/2009 |

OTHER PUBLICATIONS

Kim et al., An Efficient Scheme for Scanning Neighbor Indoor BSs in Indoor cell Coexisted OFDMA Cellular Systems, Submission for JCCI 2008.

* cited by examiner

*Primary Examiner* — Ajit Patel
(74) *Attorney, Agent, or Firm* — Jefferson IP Law, LLP (57) ABSTRACT

The present invention relates to a femtocell search method for a handover from a macrocell to a femtocell. The present invention relates to a method for a terminal that accesses a macrocell to search a femtocell in an environment where a plurality of femtocells are overlapped in one macrocell. The terminal searches a femtocell by using a dummy preamble in order to minimize the size of neighbor cell lists broadcasted from the macrocell to the terminal. Therefore, according to the present invention, an MAC overhead can be minimized by eliminating neighbor femtocell lists in a mobile neighbor advertisement (MOB_NBR_ADV) message broadcasted from the macrocell, and the terminal can search a femtocell with a minimum scanning load by checking only a femtocell dummy preamble in a dedicated symbol of the macrocell.

14 Claims, 7 Drawing Sheets

FEMTOCELL SEARCH METHOD FOR MACRO TO FEMTO HANDOVER

TECHNICAL FIELD

The present invention relates to a femtocell search method, and more particularly, it relates to a method for searching a femtocell for performing a handover from a macrocell to a femtocell.

BACKGROUND ART

A femtocell is a tiny mobile communication base station for use in the home or home office. That is, the femtocell implies a tiny base station having low output, and provides a wired/wireless convergence service to a user by connecting a mobile phone and the Internet. Typically, the service area of a femtocell is about a 20 m radius. The femtocell improves call performance of an indoor area that cannot be covered by a macrocell or shares a macrocell load in an overload area, and has a merit of communication cost reduction for a user's point of view.

The femtocell uses a specialized technique such as automatic cell-configuration, and solves not only IP address composition and security composition but also interference between a macrocell and a femtocell by using automatic network planning function. In this case, for automatic cell composition, the femtocell should be able to initially or periodically operate in a sniffer mode. In the sniffer mode, the femtocell performs like a terminal that can search neighbor macrocells and femto-cells so that it can generate a neighbor cell list, set power saving control and frequency, and share such information with a neighbor macrocell.

In a conventional cellular system where only macrocells exist, a macrocell includes scanning information such as a neighbor cell list (e.g., a cell ID, a frequency index, a preamble index, and so on) in a mobile neighbor advertisement (MOB_NBR_ADV) message and broadcasts the message to the terminal. Therefore, the terminal can search neighbor macrocells without scanning all macrocells. That is, an unnecessary scanning load can be reduced by eliminating a frequency and a preamble that are not included in the neighbor cell list.

However, if such a method is applied to an environment where a macrocell and a femtocell are overlapped, the macrocell includes not only information on a neighbor macrocell but also scanning information (e.g., a cell ID, a frequency index, a preamble index, and so on) of an overlapped neighbor femtocell in a mobile neighbor advertisement message and broadcasts the message to the terminal in order to support the terminal to search not only neighbor macrocells but also neighbor femtocells.

Since femtocell coverage is very small, many femtocells may exist in one macrocell. Therefore, when all of the neighbor macrocell lists and neighbor femtocell lists are broadcasted to the terminal by using the conventional method, the amount of information related thereto may be rapidly increased. In addition, although the terminal receives all the neighbor macrocell lists and neighbor femtocell lists from the macrocell, scanning delay and power consumption are increased as the terminal scans all neighbor macrocells and neighbor femtocells in the lists. Particularly, when the femtocell uses a frequency that is different from that of the macrocell in consideration of interference therebetween, the cell search load of the terminal is further increased.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

Therefore, the present invention provides a femtocell search method for a macrocell to femtocell handover. The method has an advantage of minimizing the femtocell search load of a terminal while minimizing the amount of information in a neighbor femtocell list that is broadcasted to the terminal from a macrocell.

Technical Solution

According to an aspect of the present invention, a search method for searching a second base station is provided to a terminal in an environment where a cell of a first base station and a plurality of cells of a plurality of second base stations are overlapped.

The search method includes: checking dummy preamble information on the plurality of second base stations by receiving a message broadcasted from the first base station; receiving a plurality of dummy preambles broadcasted from the plurality of second base stations through a predetermined dedicated symbol; and measuring received signal strength from the plurality of dummy preambles, and searching a candidate base station according to the measuring result.

According to another aspect of the present invention, a search method in an environment where a cell of a first base station and a plurality of cells of a plurality of second base stations are overlapped is provided.

The search method includes: allocating a dedicated symbol to be used for broadcasting a dummy preamble to a terminal from the second base station; broadcasting a message to the terminal, the message including at least one of cell IDs of the plurality of cells generated by the plurality of second base stations, a frequency index, and a preamble index; receiving a femtocell information request message that includes a cell ID from the terminal that has received the dummy preamble broadcasted from the second base station; and including a neighbor femtocell list that includes the cell ID among pre-stored neighbor femtocell lists in a femtocell information response message and transmitting the femtocell information response message to the terminal.

Advantageous Effects

According to the present invention, MAC overhead can be minimized by eliminating a neighbor femtocell list in a mobile neighbor advertisement message transmitted from a macrocell.

In addition, a terminal can search a femtocell with a minimum scanning load by checking only a femtocell dummy preamble in a dedicated symbol of the macrocell.

In addition, since a dedicated symbol is preoccupied on the basis of received signal strength information when using a dedicated symbol, interference between femtocell dummy preambles can be minimized.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

In the specification, a mobile station (MS) may refer to a terminal, a mobile terminal (MT), a subscriber station (SS), a portable subscriber station (PSS), a user equipment (UE) apparatus, an access terminal (AT), or the like. In addition, the mobile station may include all or some functions of the mobile terminal, the subscriber station, the portable subscriber station, the user equipment apparatus, or the like.

Further, a base station (BS) may refer to an access point (AP), a radio access station (RAS), a Node-B, a base transceiver station (BTS), an MMR-BS, or the like. The base station may include all or some functions of the access point, the radio access station, the Node-B, the base transceiver station, the MMR-BS, or the like.

In an exemplary embodiment of the present invention, at least one dedicated symbol for periodic femtocell dummy preamble transmission is allocated in a downlink transmission frame structure of a macrocell. A terminal periodically scans at least one dedicated symbol that is predetermined in the macrocell so as to search a femtocell that uses an operating frequency that is different from that of the macrocell. Here, in search of a femtocell or a macrocell, the femtocell or the macrocell implies a base station that forms the femtocell or the macrocell, but it is referred to as a femtocell or a macrocell for convenience of description.

Therefore, when a macrocell and a femtocell have different frequencies, the terminal can search the femtocell without changing the frequency even though a neighbor femtocell is not provided. In the exemplary embodiment of the present invention, a dummy preamble of a femtocell is the same as a typical preamble, but it implies a preamble for simply obtaining a femtocell ID and a received signal strength indication (RSSI) value. The dummy preamble of the femtocell may have a structure that additional information other than the preamble is not linked in a frame structure.

A femtocell search method for a terminal that performs a macrocell to femtocell handoff will now be described in further detail with reference to the drawings.

Figure 1:
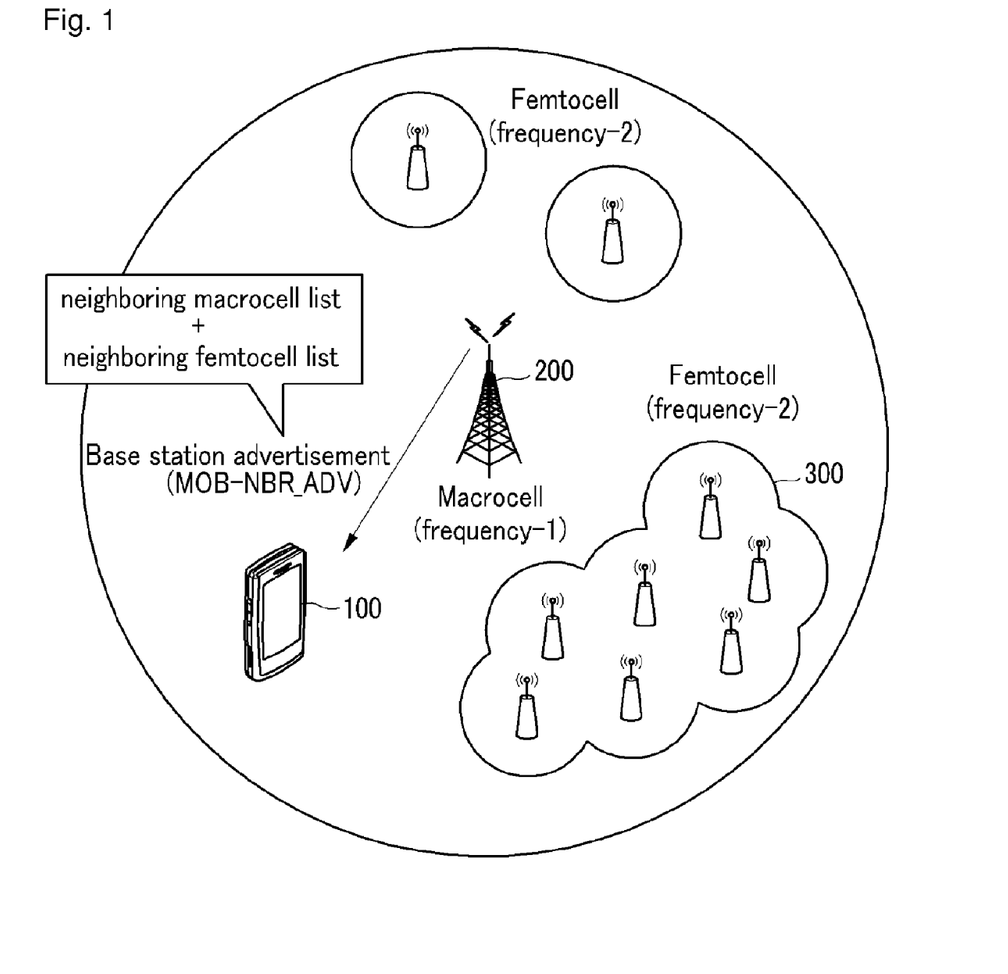
FIG. 1 shows an environment where a macrocell and a femtocell have overlapped coverage according to an exemplary embodiment of the present invention.

FIG. 1 shows an environment where a macrocell and a femtocell have overlapped coverage according to an exemplary embodiment of the present invention.

In the exemplary embodiment of the present invention, two methods may be provided for searching a femtocell according to a frequency reuse factor between a base station of a macrocell and a base station of a femtocell. The first method is a case in which a frequency of a macrocell is different from that of a femtocell, that is, a case in which a frequency reuse factor is greater than 1. In addition, the second method is a case in which the frequency of the macrocell is the same as that of the femtocell, that is, a case in which the frequency reuse factor is 1.

FIG. 1 illustrates the former case, that is, the case in which the frequency of the macrocell is different from that of the femtocell.

As shown in FIG. 1, a plurality of second base stations 300 using a second frequency, that is, femtocells, exist in a macrocell of a first base station 200 that uses a first frequency. The first base station 200 sends a neighbor macrocell list to a terminal 100 through a mobile neighbor advertisement message. In addition, by using a symbol that is pre-defined between the macrocell and the femtocell, the femtocell broadcasts a femtocell list to the terminal 100 through the mobile neighbor advertisement message. The terminal 100 checks neighbor macrocells of a cell where the terminal 100 is located and information of the femtocells through mobile neighbor advertisement messages received from a plurality of femtocells 300.

A downlink frame transmission structure of the first and second cases will now be described with reference to FIG. 2 to FIG. 5.

Figure 2:
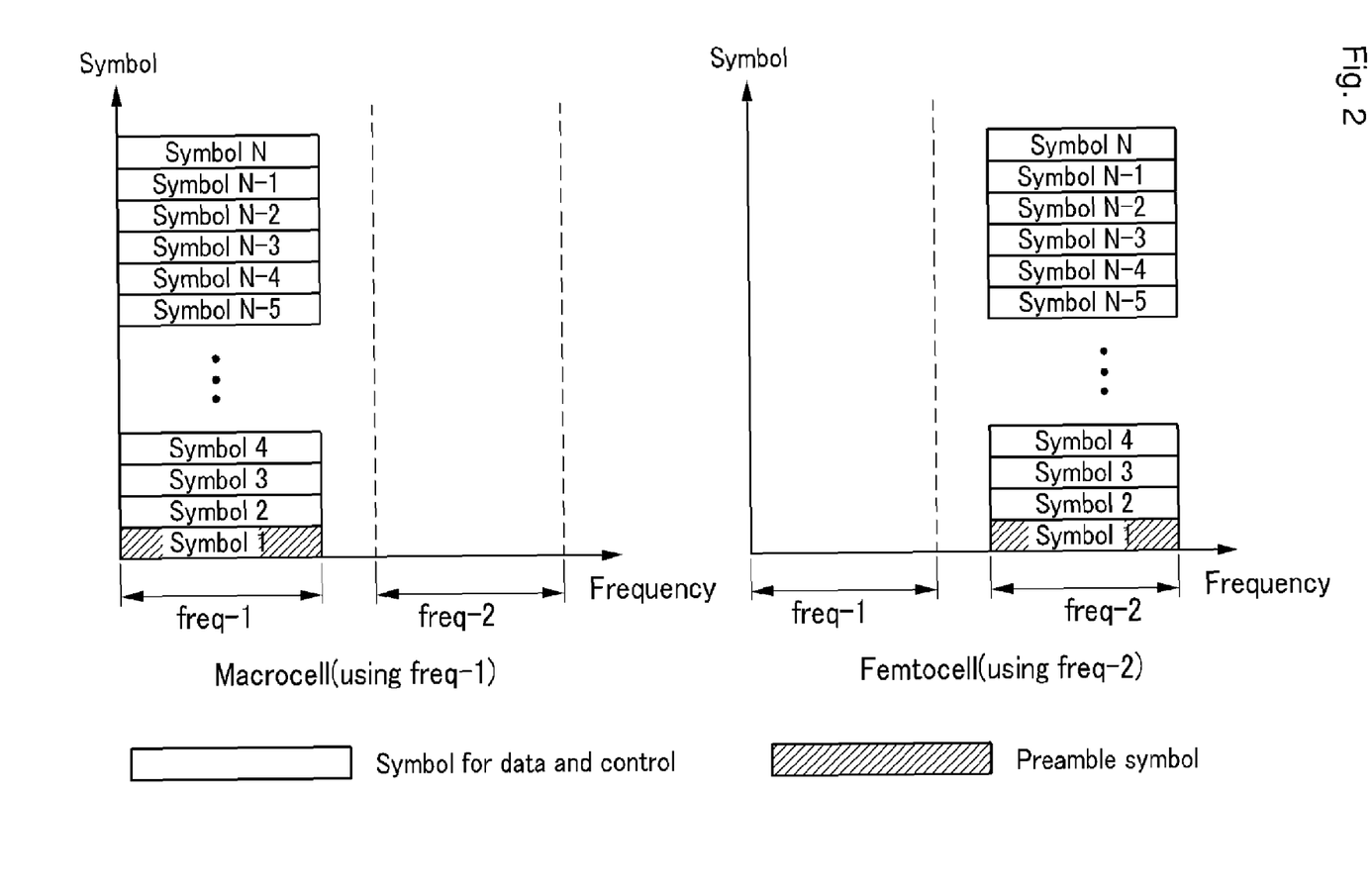
FIG. 2 and FIG. 3 show downlink frame transmission structures of a macrocell and a femtocell according to a first exemplary embodiment of the present invention
Figure 3:
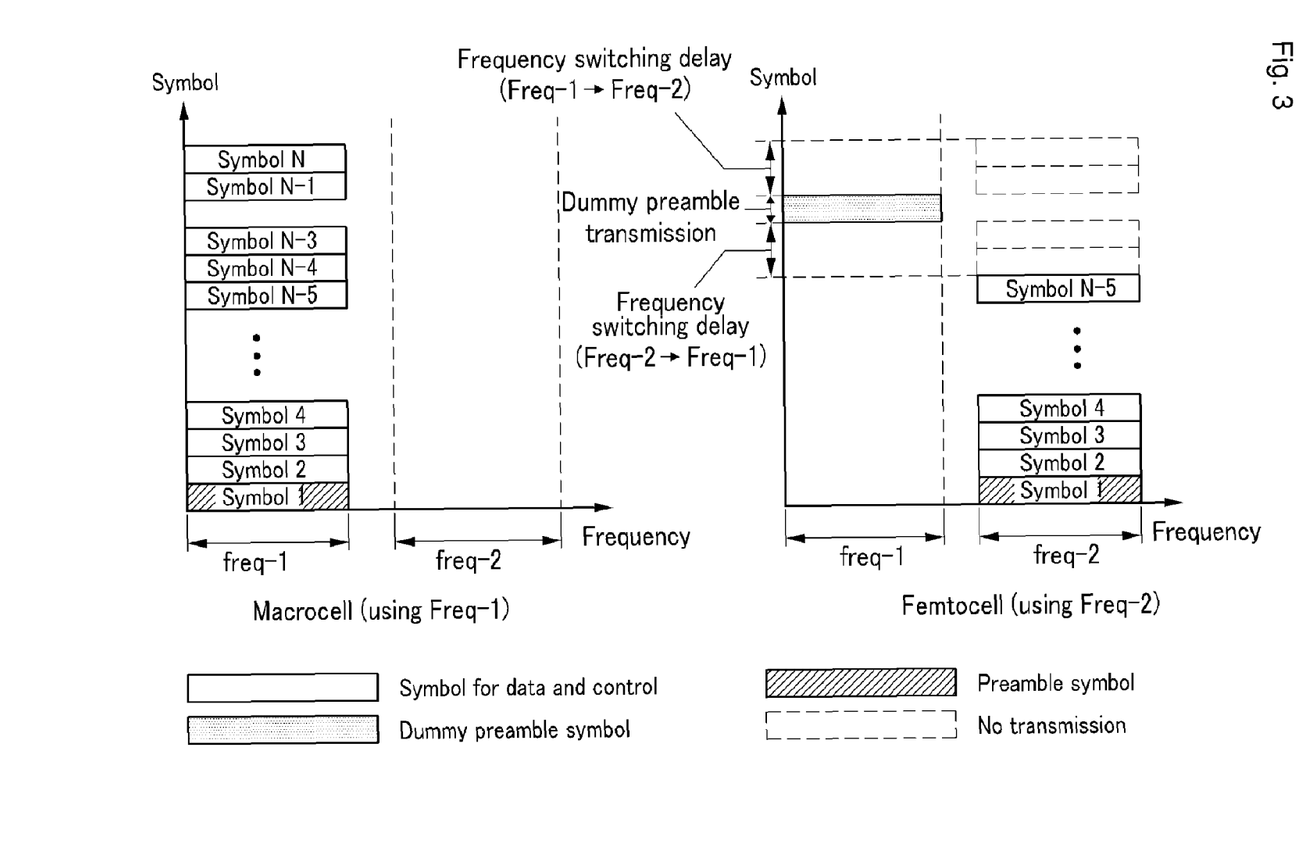
Figure 4:
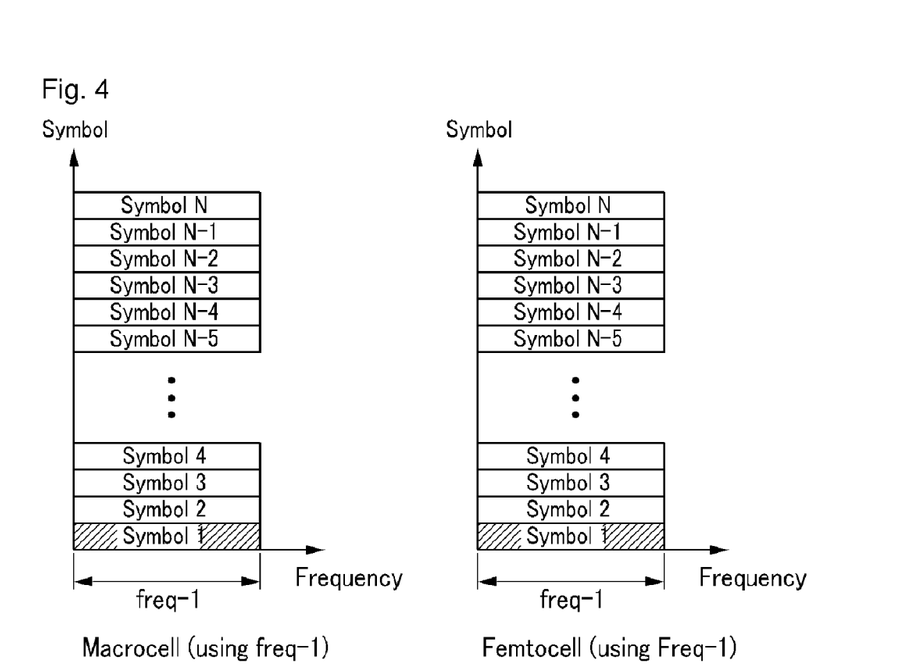
FIG. 4 and FIG. 5 show downlink frame transmission structures of a macrocell and a femtocell according to a second exemplary embodiment of the present invention.
Figure 5:
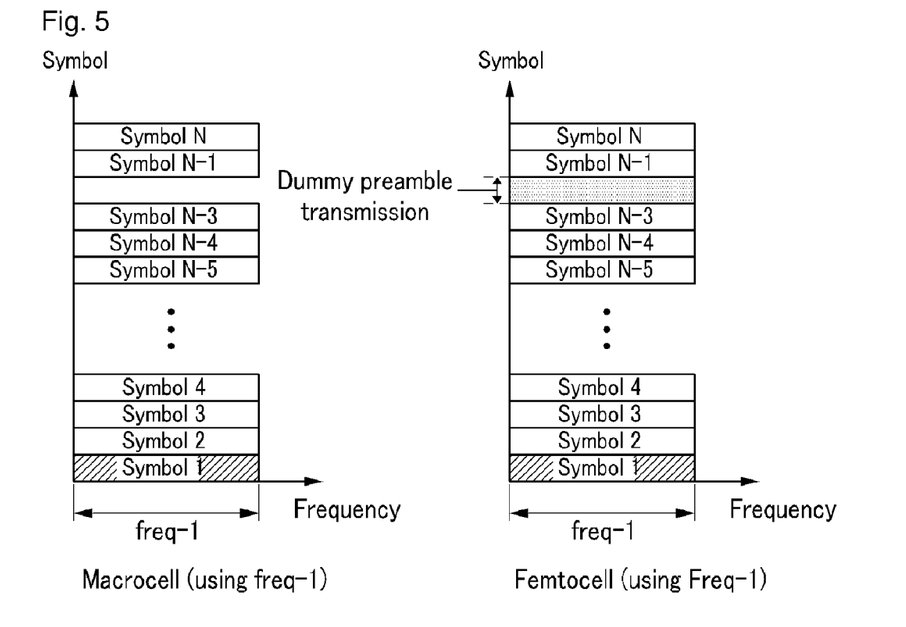

FIG. 2 and FIG. 3 exemplarily show a downlink frame transmission structure of a macrocell and a femtocell according to a first exemplary embodiment of the present invention, and FIG. 4 and FIG. 5 exemplarily show a downlink frame transmission structure of a macrocell and a femtocell according to a second exemplary embodiment of the present invention.

FIG. 2 and FIG. 3 show a downlink frame transmission structure in the case in which a frequency of a macrocell is the same as that of a femtocell. FIG. 2 shows a general downlink transmission structure of a macrocell and a femtocell, and FIG. 3 shows a downlink transmission structure that is changed at every periodic dummy preamble transmission time.

A macrocell allocates a symbol Freq-2 that is dedicated to periodic dummy preamble transmission of a femtocell in a frame structure in an operation frequency Freq-1 of the macrocell. The downlink transmission frame structure of FIG. 3 is provided once at each period, and the general downlink transmission frame structure of FIG. 2 is provided in the remaining part of each period.

In this case, a dedicated symbol allocation period is determined according to system performance. Here, the dummy preamble refers to a preamble broadcasted by second base stations that form femtocells to inform their existence to a terminal, and the terminal may determine whether to handover to a second base station by receiving the dummy preamble since the terminal can check signal strength through the dummy preamble.

In addition, as shown in FIG. 2 and FIG. 3, the dedicated symbol may be set to a specific symbol by the first base station 200, or may be determined through negotiation between the macrocell and the femtocell. If the first base station 200 randomly sets a specific symbol to the dedicated symbol, the femtocell acquires information (including dedicated symbol timing information and a period value) on the dedicated symbol allocated by the macrocell from the macrocell through a backbone network.

The terminal 100 acquires the dedicated symbol information by receiving a mobile neighbor advertisement message that includes the dedicated symbol information broadcasted from the first base station 200 of the macrocell. In this case, the terminal 100 should know a time point that the femtocell 300 broadcasts a dummy preamble in advance.

The femtocell changes a radio frequency from its operation frequency Freq-2 to the operation frequency Freq-1 of the macrocell corresponding to the periodically allocated dedicated symbol timing, and then broadcasts the dummy preamble to the terminal 100 and changes to the operation frequency Freq-2 of the femtocell within the dedicated symbol. Therefore, frequency switching delay may occur in the femtocell during the frequency change, and symbols (e.g., Symbol N, Symbol N−1, Symbol N−3, and Symbol N−4) of the femtocell may be used for the frequency change for a delayed time period.

The terminal 100 in the macrocell performs dummy preamble scanning at the dedicated symbol timing within a frequency Freq-1 of the corresponding macrocell for searching for a femtocell. In this case, if dummy preambles of femtocells are detected and femtocells that correspond to triggering conditions (e.g., signal strength) for a handover from a macrocell to a femtocell are selected, identifications (IDs) of the femtocells are acquired from the corresponding dummy preambles. In addition, the terminal 100 generates a femtocell information request (MOB_FEMTO_REQ) message that includes the acquired femtocell IDs and unicasts the generated message to a first base station of a serving macrocell.

The macrocell having received the femtocell information request message from the terminal 100 generates a femtocell information response (MOB_FEMTO_RSP) message that includes a neighbor femtocell list of candidate femtocells that correspond to the femtocell IDs and transmits the generated message to the terminal 100. The terminal 100 having received the femtocell information response message from the serving macrocell acquires the neighbor femtocell lists, and re-scans the candidate femtocells by using the corresponding frequency index and preamble index.

As described, the terminal 100 can acquire information on a femtocell ID for femtocell recognition and a RSSI value for handover trigger through the dummy preamble. Therefore, the terminal acquires a candidate femtocell list through a one-way transmission/receiving method with a macrocell, and re-scans only a target femtocell for handover.

That is, a load of a conventional terminal for scanning femtocells according to a frequency index and a preamble index can be minimized since the terminal 100 needs to scan only a predetermined dedicated symbol within an operation frequency range of a macrocell for searching a femtocell. In addition, MAC overhead can be minimized since scanning information on neighbor femtocells can be eliminated from a mobile neighbor advertisement message broadcasted from a macrocell.

Next, the second exemplary embodiment, that is, the case in which the frequency of the macrocell is the same as that of the femtocell, will be described. FIG. 4 shows a downlink transmission frame structure of a general macrocell and a general femtocell, and FIG. 5 shows a downlink transmission frame structure that changes at every periodical dummy preamble transmission time.

A structure and an operation method of a transmission frame of the second exemplary embodiment of the present invention are the same as those of the first exemplary embodiment. However, in the second exemplary embodiment, frequency switching for transmitting a dummy preamble does not need to be performed in a femtocell because the macrocell and the femtocell have the same operation frequency. Therefore, frequency switching delay does not occur.

As described with reference to FIG. 2 to FIG. 5, interference between dummy preambles of neighbor femtocells may occur when a plurality of femtocells located in a macrocell transmit dummy preambles in one dedicated symbol. Therefore, with respect to interference between a plurality of dummy preambles according to a general method of FIG. 6, a method for minimizing interference between a plurality of dummy preambles according to an exemplary embodiment of the present invention will be described with reference to FIG. 7.

Figure 6:
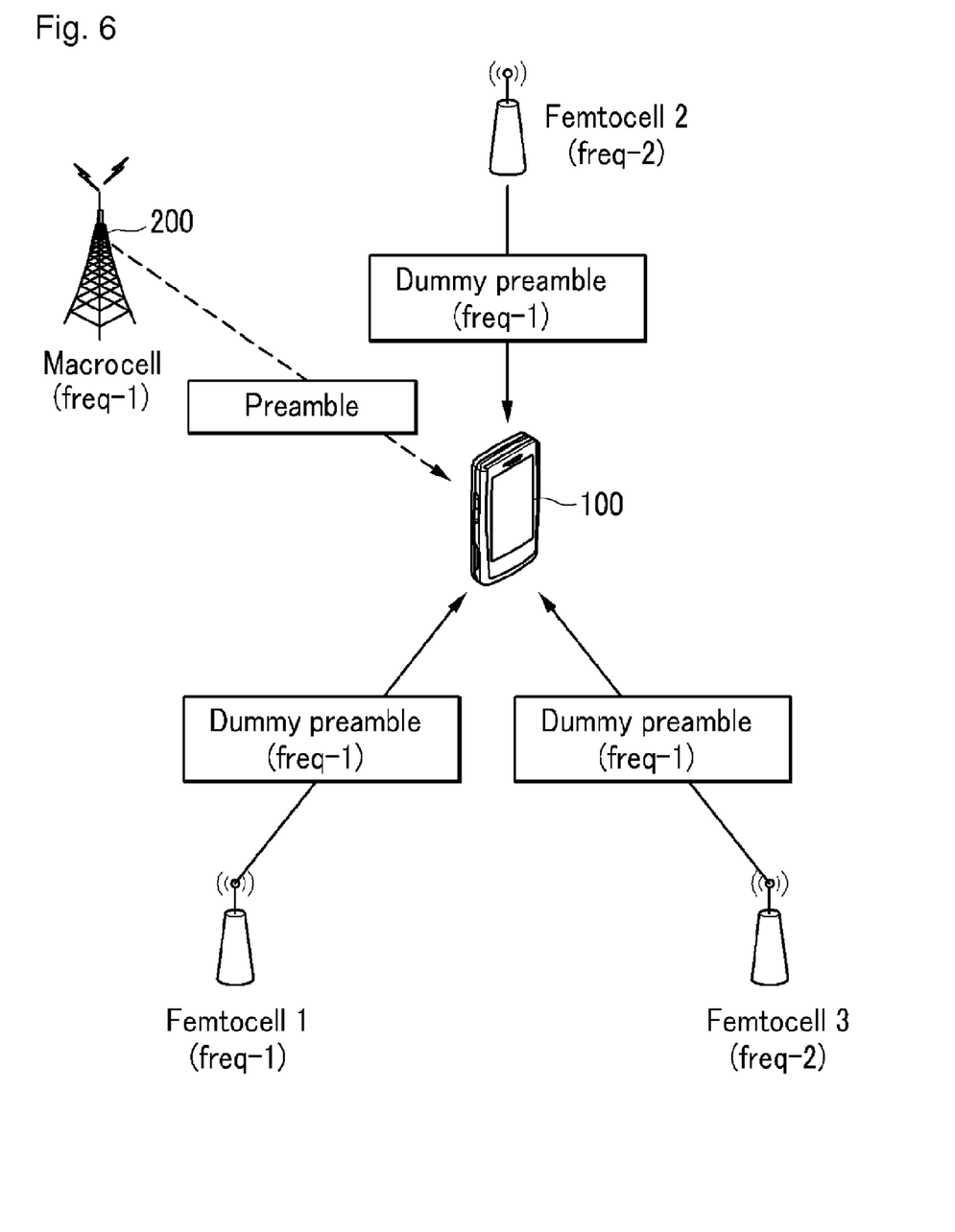
FIG. 6 shows interference between general dummy preambles.

FIG. 6 shows interference between general dummy preambles.

As shown in FIG. 6, when one dedicated symbol is allocated for dummy preambles, interference between dummy preambles of neighbor femtocells occurs. That is, if one dedicated symbol (e.g., Symbol 2) is allocated within an operation frequency of a macrocell for femtocell dummy preamble transmission, interference between dummy preambles may occur when neighbor femtocells 1, 2, and 3 simultaneously transmit their dummy preambles at one dedicated symbol timing.

Figure 7:
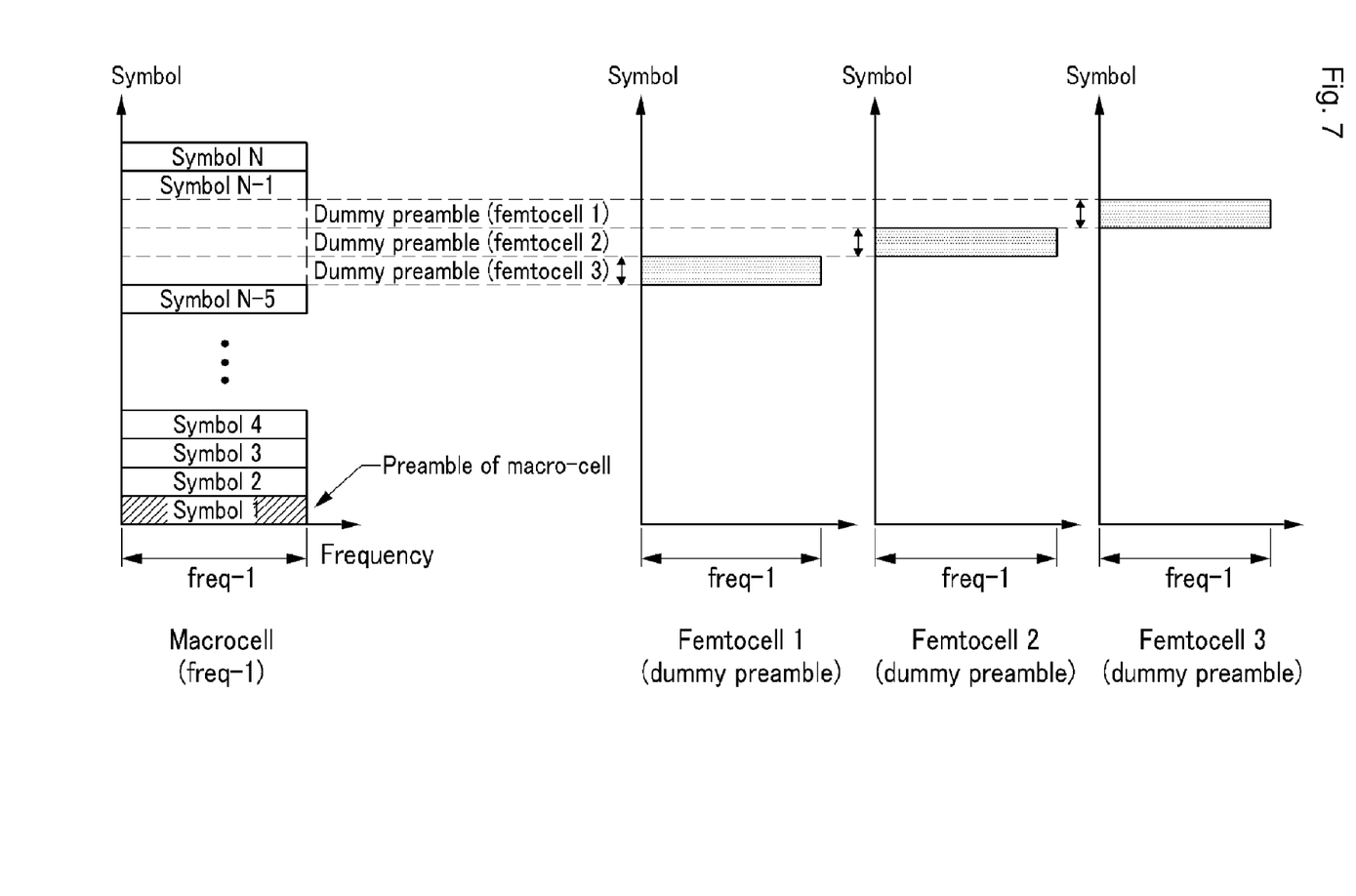
FIG. 7 shows downlink frame transmission structures of the macrocell and the femtocell for minimizing interference between dummy preambles according to the exemplary embodiment of the present invention.

Therefore, as shown in FIG. 7, interference can be avoided since several dedicated symbols for transmitting dummy preambles of femtocells are allocated to neighbor femtocells so that each neighbor femtocell can transmit a dummy preamble with a different dedicated symbol. FIG. 7 shows a downlink frame transmission structure of a macrocell and a femtocell for minimizing interference between dummy preambles according to the second exemplary embodiment of the present invention.

In order to allocate different dedicated symbols to neighbor femtocells, the femtocell operates in a search mode to scan neighbor femtocells at an initial stage. In addition, the femtocell performs negotiation for dedicated symbol allocation with the searched neighbor femtocells through a backbone network. That is, the femtocell first uses a dedicated symbol that is not used by the neighbor femtocells. If all dedicated symbols are preoccupied, the femtocell shares a dedicated symbol of a neighbor femtocell having the lowest RSSI so as to minimize interference between dummy preambles.

The femtocell search method of the terminal located in the macrocell described above will now be described in further detail with reference to FIG. 8.

Figure 8:
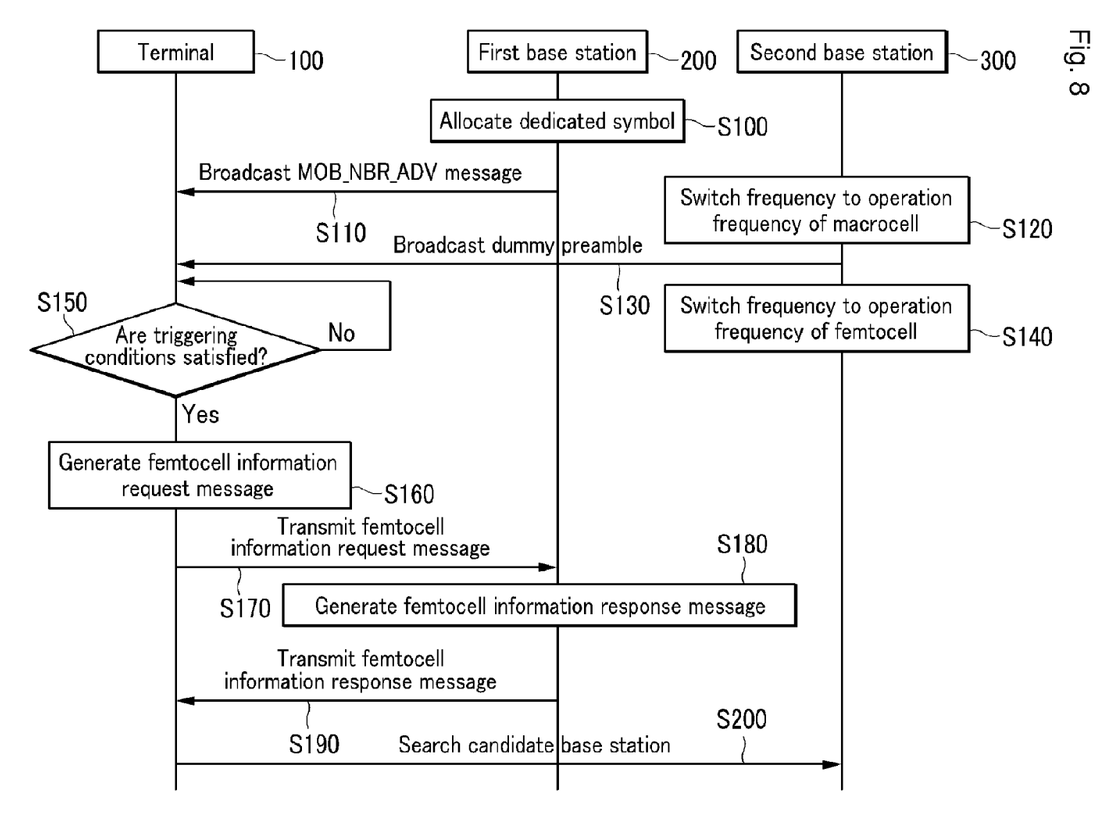
FIG. 8 is a flowchart of a femtocell search method according to an exemplary embodiment of the present invention

FIG. 8 is a flowchart of the femtocell search method according to the exemplary embodiment of the present invention.

In the exemplary embodiment of the present invention, it is assumed that a plurality of second base stations 300 located in a femtocell exist in an area of a first base station 200 located in a macrocell and that the macrocell and the femtocell use different frequencies. In FIG. 8, one second base station is shown, but that does not imply existence of only one second base station.

As shown in FIG. 8, the first base station 200 located in the macrocell allocates a dedicated symbol with a random period so that the second base stations 300 located in the femtocell can broadcast dummy preambles (S100). In the exemplary embodiment of the present invention, the first base station 200 allocates a random dedicated symbol, but the present invention is not limited thereto. In addition, it is assumed that interference does not occur between neighbor femtocells.

The first base station 200 broadcasts a mobile neighbor advertisement message through the allocated dedicated symbol (S110). The mobile neighbor advertisement message includes not only dedicated symbol information for a dummy preamble but also information such as a cell ID, a frequency, an index, a preamble index, and information on when dummy preamble is broadcasted form the second base station to the terminal 100.

The terminal 100 receives the mobile neighbor advertisement message broadcasted from the first base station 200, collects dedicated symbol information on femtocells of the second base stations 300, and then continuously communicates with the first base station 200. At the random period set by the first base station 200, the second base stations 300 switch frequency to an operation frequency of the macrocell (S120), and respectively broadcast dummy preambles to the dedicated symbol allocated by the first base station 200 (S130).

Then, the second base stations 300 re-switch the frequency switched to the operation frequency of the macrocell to an operation frequency of the femtocell. Here, the dummy preamble may be the same as a typical preamble, but it implies a preamble for a terminal to simply obtain a femtocell ID and an RSSI value of a femtocell that has been broadcasted from a femtocell. That is, the dummy preamble has a structure that additional information other than the preamble is not linked in a frame structure.

The terminal 100 having received the plurality of dummy preambles respectively broadcasted from the second base stations 300 determines whether triggering conditions are satisfied through the dummy preambles (S150). A method for determining whether or not the triggering conditions are satisfied may vary, but in the present exemplary embodiment, it is determined on the basis of acquisition of a received signal strength indication (RSSI) value at receiving of the dummy preamble.

The terminal 100 checks whether a dummy preamble having an RSSI value is greater than a predetermined reference value among the received plurality of dummy preambles, and if the preamble exists, the terminal 100 collects a femtocell ID in the dummy preamble and generates a femtocell information request message and transmits the generated message to the first base station 200 (S160). However, when none of the plurality of dummy preambles has an RSSI value that is less than the predetermined reference value, the terminal 100 does not perform handoff to the femtocell.

The first base station 200 having received the femtocell information request message from the terminal 100 acquires femtocell IDs included in the femtocell information request message (S170). In addition, the first base station 200 generates a femtocell information response message that includes a neighbor femtocell list for the acquired femtocell IDs (S180), and transmits the generated message to the terminal 100 (S190).

The terminal 100 having received the femtocell information response message from the first base station 200 acquires the neighbor femtocell list included in the femtocell information response message and researches candidate base stations by using a frequency index and a preamble index of the corresponding femtocell list (S200). Here, a method for researching the candidate base stations is the same as a base station search method that is performed for a general handoff.

If the macrocell and the femtocell use the same frequency, the frequency switching process performed in the steps of S120 and S140 is not performed. In addition, when interference between femtocells occurs, the first base station 200 allocates a plurality of dedicated symbols in the step of S100. Further, when the second base stations broadcast the dummy preambles in the step of S130, the second base stations use different dedicated symbols to avoid interference.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A search method of a terminal for searching a second base station in an environment where a cell of a first base station and a plurality of cells of a plurality second base stations are overlapped, comprising:
   checking dummy preamble information on the plurality of second base stations by receiving a message broadcasted from the first base station;
   receiving a plurality of dummy preambles that have a predetermined dedicated symbol assigned by the first base station and are broadcasted from the plurality of second base stations based on the dummy preamble information on the predetermined dedicated symbol; and
   measuring received signal strengths from the plurality of dummy preambles, and searching a candidate base station according to the measured result.

2. The search method of claim 1, wherein the message broadcasted from the first base station includes at least one of information on the dedicated symbol, cell identifiers (IDs) of the plurality of cells generated by the plurality of second base stations, a frequency index, and a preamble index.

3. The search method of claim 1, wherein a cell ID and a received signal strength indication (RSSI) value of each of the plurality of second base stations that have broadcasted the plurality of dummy preambles are acquired from the plurality of dummy preambles.

4. The search method of claim 3, wherein the searching of the candidate base station comprises:
   determining whether a dummy preamble having received signal strength that is greater than a predetermined reference value exists among the plurality of dummy preambles;
   if a dummy preamble having the received signal strength that is greater than the reference value exists, requesting information on a second base station that has broadcasted the dummy preamble, from the first base station;
   receiving the information from the first base station, and setting a second base station of dummy preambles each of which has received signal strength that is greater than a predetermined reference value to a candidate base station; and
   searching the candidate base station.

5. The search method of claim 4, wherein the requesting of the information on the second base station from the first base station comprises generating a femtocell information request message that includes the cell ID acquired from the dummy preamble.

6. The search method of claim 4, wherein the setting of the candidate base station further comprises receiving a femtocell information response message that includes a neighbor femtocell list of a second base station that has broadcasted the dummy preamble of which received signal strength is greater than the reference value from the first base station.

7. A search method of a base station in an environment where a cell of a first base station and a plurality of cells of a plurality of second base stations are overlapped, comprising:
   allocating a dedicated symbol to be used for broadcasting a dummy preamble to a terminal from the plurality of second base stations;
   broadcasting a message to the terminal, the message including at least one of cell IDs of the plurality of cells generated by the plurality of second base stations, a frequency index, a preamble index, and information on the dedicated symbol for the dummy preamble;
   receiving a femtocell information request message that includes a cell ID from the terminal that has received the dummy preamble broadcasted from the plurality of second base stations; and
   including a neighbor femtocell list that includes the cell ID among pre-stored neighbor femtocell lists in a femtocell information response message and transmitting the femtocell information response message to the terminal.

8. The search method of claim 7, wherein, in the allocating of the dedicated symbol, the plurality of second base stations acquire information on the allocated dedicated symbol from the first base station and checks the information.

9. The search method of claim 8, wherein, when the first base station and the plurality of second base stations use different frequencies, the search method further comprises:
   the second base station performing frequency switching from an operation frequency used by the second base station to an operation frequency used by the first base station;
   the plurality of second base stations broadcasting a dummy preamble to the terminal through a dedicated symbol that is predetermined by the first base station; and
   the plurality of second base stations performing frequency switching from the operation frequency used by the first base station to the operation frequency used by the second base station.

10. The search method of claim 9, wherein, when two or more dedicated symbols are provided, the search method comprises:
   the plurality of second base stations collecting dedicated symbol information by receiving information on the dedicated symbols from the first base station;
   the base station checking a received signal strength indication (RSSI) value of neighbor base stations when the two or more dedicated symbols are preoccupied by the neighbor base stations of the plurality of second base stations; and
   the base station sharing a dedicated symbol preoccupied by a neighbor base station having the lowest RSSI value based on the RSSI value to broadcast a dummy preamble to the terminal.

11. The search method of claim 10, wherein the first base station comprises a first base station that forms a macrocell, and the plurality of second base stations comprise a plurality of second base stations that form a plurality of femtocells.

12. The search method of claim 1, wherein the dummy preamble comprises a preamble that informs the existence of the plurality of second base stations to the terminal.

13. The search method of claim 1, wherein the searching of the candidate base station comprises, if a dummy preamble having the received signal strength that is greater than the reference value exists, requesting information on a second base station that has broadcasted the dummy preamble, from the first base station.

14. The search method of claim 1, wherein the searching of the candidate base station comprises receiving the information from the first base station, and setting a second base station of dummy preambles each of which has received signal strength that is greater than a predetermined reference value to a candidate base station.

* * * * *